(12) United States Patent
Kormos

(10) Patent No.: US 6,789,901 B1
(45) Date of Patent: Sep. 14, 2004

(54) SYSTEM AND METHOD FOR PROVIDING IMAGES FOR AN OPERATOR OF A VEHICLE

(75) Inventor: Alexander L. Kormos, Fairview, TX (US)

(73) Assignee: Raytheon Company, Waltham, MA (US)

( * ) Notice: Subject to any disclaimer, the term of this patent is extended or adjusted under 35 U.S.C. 154(b) by 175 days.

(21) Appl. No.: 10/038,988

(22) Filed: Jan. 4, 2002

(51) Int. Cl.[7] .................. G03B 21/00; G02B 27/14; G02B 27/12; G09G 5/00; B60Q 1/26
(52) U.S. Cl. .................. 353/13; 353/10; 353/12; 359/631; 359/632; 359/633; 359/636; 359/637; 359/639; 345/9; 362/489; 362/503
(58) Field of Search .................. 359/630–633, 359/636–637, 639; 353/10, 12–13; 345/7, 9; 362/1, 3–4, 7, 9–10, 17, 489, 503, 510, 518

(56) References Cited

U.S. PATENT DOCUMENTS

| | | | |
|---|---|---|---|
| 2,716,193 A | 8/1955 | Riolo | 250/215 |
| 3,803,407 A | 4/1974 | Anderson | 250/213 VT |
| 3,887,273 A | 6/1975 | Griffiths | 353/14 |
| 4,052,123 A | 10/1977 | Yamazaki et al. | 350/189 |
| 4,131,818 A | 12/1978 | Wilder | 250/333 |

(List continued on next page.)

FOREIGN PATENT DOCUMENTS

| | | | |
|---|---|---|---|
| DE | 26 33 067 A1 | 2/1978 | G08G/1/16 |
| EP | 1131293 | 10/1968 | G02B/27/10 |
| EP | 0 312 094 A2 | 4/1989 | G02B/27/00 |
| EP | 0 321 149 | 6/1989 | |

(List continued on next page.)

OTHER PUBLICATIONS

PCT International Search Report dated Aug. 31, 2000 for PCT/US00/11695 dated Apr. 26, 2000.

U.S. Ser. No. 10/163,343, filed Jun. 5, 2002, entitled "Method and System for Displaying an Image", by Alexander L. Kormos, 28 pages of text and 3 pages of drawings.

U.S. Ser. No. 09/930,639, filed Aug. 15, 2001, entitled "Method and apparatus for Displaying Information With a Head–Up Display", by Alexander L. Kormos, et al, 32 pages of text and 5 pages of drawings.

U.S. Army Night Vision and Electronic Sensors Directorate, Visionics & Image Signal Processing Division, Fort Belvoir, VA, "*FLIR Thermal Imaging Systems Performance Model*", Analyst's Reference Guide, Document RG5008993, Jan. 1993, 21 pages.

Holst, Gerald C., "Testing and Evaluation of Infrared Imaging Systems", JCD Publishing Co., 3 Cover pages, and pp. 308–343, 1993.

Richards, Oscar W., "*Visual Needs and Possibilities for Night Automobile Driving*", American Optical Corporation Research Group, Aug. 1967, 147 pages.

(List continued on next page.)

*Primary Examiner*—Russell Adams
*Assistant Examiner*—Magda Cruz
(74) *Attorney, Agent, or Firm*—Baker Botts L.L.P.

(57) ABSTRACT

A system and method for providing images for an operator of a vehicle include the capability to receive electrical signals representing electromagnetic radiation at an image source and to generate a visual image based on the electrical signals. The system and method further include the capability to reflect different portions of the visual image with a magnifying optical element for presentation at different viewing locations, the visual image appearing as a virtual image, wherein at least one dimension of the visual image is larger than the magnifying optical element can use to present an image at one of the viewing locations.

28 Claims, 3 Drawing Sheets

U.S. PATENT DOCUMENTS

| | | | |
|---|---|---|---|
| 4,527,861 A | 7/1985 | Van Duyn | 359/606 |
| 4,664,475 A | 5/1987 | Ferrer | 350/174 |
| 4,740,780 A | 4/1988 | Brown et al. | 345/7 |
| 4,868,652 A | 9/1989 | Nutton | 358/113 |
| 4,919,517 A | 4/1990 | Jost et al. | 359/630 |
| 4,934,771 A | 6/1990 | Rogers | 350/1.2 |
| 4,961,625 A | 10/1990 | Wood et al. | 350/174 |
| 4,970,653 A | 11/1990 | Kenue | 701/301 |
| 5,001,558 A | 3/1991 | Burley et al. | 358/113 |
| 5,013,135 A | 5/1991 | Yamamura | 350/174 |
| 5,023,451 A | 6/1991 | Burley | 250/330 |
| 5,028,119 A | 7/1991 | Hegg et al. | 350/174 |
| 5,056,890 A | 10/1991 | Iino et al. | 359/630 |
| 5,237,455 A | 8/1993 | Bordo et al. | 359/632 |
| 5,289,312 A | 2/1994 | Hashimoto et al. | 359/487 |
| 5,289,315 A | 2/1994 | Makita et al. | 359/634 |
| 5,299,062 A | 3/1994 | Ogata | 359/571 |
| 5,361,165 A | 11/1994 | Stringfellow et al. | 359/631 |
| 5,414,439 A | 5/1995 | Groves et al. | 345/7 |
| 5,497,271 A | 3/1996 | Mulvanny et al. | 359/631 |
| 5,504,622 A | 4/1996 | Oikawa et al. | 359/630 |
| 5,506,595 A | 4/1996 | Fukano et al. | 345/7 |
| 5,657,163 A | 8/1997 | Wu et al. | 359/630 |
| 5,686,957 A | 11/1997 | Baker | 348/36 |
| 5,729,016 A | 3/1998 | Klapper et al. | 250/334 |
| 5,731,903 A | 3/1998 | Cook | 359/633 |
| 5,734,357 A | 3/1998 | Matsumoto | 345/7 |
| 5,739,848 A | 4/1998 | Shimoura et al. | 348/119 |
| 5,748,377 A | 5/1998 | Matsumoto et al. | 359/633 |
| 5,781,243 A | 7/1998 | Kormos | 348/556 |
| 5,805,119 A * | 9/1998 | Erskine et al. | 345/7 |
| 5,859,714 A | 1/1999 | Nakazawa et al. | 359/13 |
| 5,864,432 A | 1/1999 | Deter | 359/634 |
| 5,867,133 A | 2/1999 | Toffolo et al. | 345/7 |
| 5,973,827 A | 10/1999 | Chipper | 359/356 |
| 6,014,259 A | 1/2000 | Wohlstadter | 359/619 |
| 6,072,444 A | 6/2000 | Burns | 345/7 |
| 6,100,943 A | 8/2000 | Koide et al. | 349/11 |
| 6,262,848 B1 * | 7/2001 | Anderson et al. | 359/630 |
| 6,359,737 B1 | 3/2002 | Stringfellow | 359/631 |
| 6,392,812 B1 | 5/2002 | Howard | 359/633 |
| 6,443,573 B2 * | 9/2002 | Aoki | 353/13 |
| 6,580,562 B2 * | 6/2003 | Aoki et al. | 359/630 |
| 2002/0005999 A1 | 1/2002 | Hutzel et al. | 359/838 |
| 2002/0063778 A1 * | 5/2002 | Kormos | 348/148 |

FOREIGN PATENT DOCUMENTS

| | | | | |
|---|---|---|---|---|
| EP | 0 515 328 A1 | 11/1992 | | G02B/27/00 |
| EP | 0 596 729 A2 | 5/1994 | | |
| EP | 0 643 315 A1 | 3/1995 | | G02B/27/01 |
| EP | 0 710 866 A1 | 5/1996 | | G02B/27/01 |
| EP | 0 742 460 A2 | 11/1996 | | G02B/27/01 |
| EP | 0 818 701 A2 | 1/1998 | | |
| EP | 0 859 413 A2 | 8/1998 | | |
| EP | 1 076 255 A2 | 4/2000 | | G02B/27/01 |
| FR | 2 693 807 | 1/1994 | | G02B/27/18 |
| GB | 1 584 573 | 2/1981 | | |
| GB | 2 246 900 A | 2/1992 | | G09F/19/18 |
| JP | 09185012 | 7/1997 | | |
| JP | 2000280823 | 10/2000 | | |
| WO | WO 89/03059 | 4/1989 | | G02B/27/00 |
| WO | WO 98/28602 | 7/1998 | | G01J/5/62 |
| WO | WO 99/33684 | 7/1999 | | B60R/1/00 |
| WO | WO 01/63232 A1 | 8/2001 | | |
| WO | WO 02/31439 A2 | 4/2002 | | |

OTHER PUBLICATIONS

U.S. patent application Ser. No. 09/558,700, filed Apr. 25, 2000, entitled "*Method and Apparatus for Obtaining Infrared Images in a Night Vision System*", Alexander L. Kormos, inventor, 30 pages; 3 pages of drawings.

U.S. patent application Ser. No. 09/972,542, filed Oct. 8, 2001, entitled "*System and Method for Forming Images for Display in a Vehicle*", Alexander L. Kormos, inventor, 39 pages; 4 pages of drawings.

Richards, Oscar W., "Visual Needs and Possibilities for Night Automobile Driving", American Optical Corporation, Southbridge, Massachusetts, 08/67, two cover pages, pp. i, iii, v, vii, ix, xi, 1–36, 38–66 and 124–138.

U.S. Ser. No. 09/747,035, filed Dec. 21, 2000, entitled "Method and Apparatus for Reducing Distortion in a Display Image", by Douglas W. Anderson, 18 pages of text and 2 pages of drawings.

U.S. Ser. No. 09/972,543, filed Oct. 8, 2001, entitled "System and Method for Forming Images for Display in a Vehicle", by Alexander I. Kormos, 39 pages of text and 4 pages of drawings.

"Method and System for Displaying an Image", Specification, Claims and Abstract (28 pages), 4 pages of drawings, inventor Alexander L. Kormos, filed Jun. 5, 2002.

"Method and System for Deploying a Mirror Assembly from a Recessed Position", Specification, Claims and Abstract (27 pages), 6 pages of drawings, inventors Aaron T. Raines, et al, filed Jun. 4, 2002.

PCT International Search Report dated Jun. 26, 2002, for PCT/US01/31952 filed Oct. 11, 2001.

Fresnel Optics, Inc., Product Overview, Cover plus 7 pages, unknown.

Scott, Luke, and D'Agostino, John, "*NVEOD FLIR92 Thermal Imaging Systems Performance Model*", 10 pages, unknown.

RCA Electro–Optics Handbook, "*Detection, Resolution and Recognition*", 2 Cover Pages, Foreword, plus pp. 118–121, 1974.

Smith, Warren J., "*Modern Optical Engineering, The Design of Optical Systems*", Inside and Outside Cover plus pp. 104–109, McGraw–Hill Book Co., 1966.

\* cited by examiner

SYSTEM AND METHOD FOR PROVIDING IMAGES FOR AN OPERATOR OF A VEHICLE

TECHNICAL FIELD OF THE INVENTION

This invention relates in general to optical systems, and, more particularly, to a system and method for providing images for an operator of a vehicle.

BACKGROUND OF THE INVENTION

During daylight hours, the driver of a vehicle is able to detect and recognize objects that would be difficult, if not impossible, to detect or recognize at night. For example, on a sunny day, a deer approximately 500 meters ahead of a vehicle should be readily detectable and recognizable. At night, however, particularly when the headlights provide the only illumination, the deer will not be detectable, much less recognizable, at that distance because it will be beyond the range of the headlights. Moreover, by the time the driver detects the deer, and well, before recognizing what it is, the vehicle will be much closer to the deer than during daylight. Accordingly, the risk of a resulting accident is much higher at night than during the day.

Consequently, in order reduce the risk of accidents, night vision systems have been developed to supplement the driver's vision. Typical night vision systems include an infrared camera unit mounted in the grill of the vehicle and an image source mounted in the vehicle's dashboard. The camera unit gathers information regarding the scene in front of the vehicle, and the image source projects an image derived from the information onto the windshield for display.

Using the windshield for image display, however, has several drawbacks. For example, the illumination of the image may be poor because a large amount of light is lost due to refraction. As another example, the image may be distorted because of the windshield's varying curvature.

To address these drawbacks, several night vision systems are proposing to use a magnifying optical element mounted to the dashboard as the combiner. Because of vision and aesthetic considerations, however, there is a continuing demand to reduce the size of the combiner. Moreover, if the combiner is to retract into the dashboard when not in use, additional sizing concerns may come into play. Unfortunately, reducing the size of the combiner usually decreases the field-of-view that may be presented to the operator of the vehicle.

SUMMARY OF THE INVENTION

In accordance with the present invention, at least some of the disadvantages and problems associated with previous systems and methods for providing images for an operator of a vehicle have been substantially reduced or eliminated. Accordingly, at least in particular embodiments, the invention provides a low-profile combiner for an image display system that has an acceptable field-of-view for the operator.

In particular embodiments, a method for providing images for an operator of a vehicle includes receiving electrical signals representing electromagnetic radiation at an image source and generating a visual image based on the electrical signals. The method also includes reflecting different portions of the visual image with a magnifying optical element for presentation at different viewing locations, the visual image appearing as a virtual image, wherein at least one dimension of the visual image is larger than the magnifying optical element can use to present an image at one of the viewing locations.

In certain embodiments, a system for providing images for an operator of a vehicle includes an image source and a magnifying optical element. The image source is operable to receive electrical signals representing electromagnetic radiation and to generate a visual image based on the electrical signals. The magnifying optical element is operable to reflect different portions of the visual image for presentation at different viewing locations, the visual image appearing as a virtual image, wherein at least one dimension of the visual image is larger than the magnifying optical element can use to present an image at one of the viewing locations.

The present invention has several technical features. For example, in some embodiments, the invention allows more of a visual image to be observed than the optical configuration will allow at one viewing location. Thus, an adequate view of the scene outside the vehicle may be achieved even when optical considerations do not allow complete viewing of the scene at one viewing location. As another example, in certain embodiments, the distracting features of the border effect are attenuated and/or distortions and/or aberrations caused by imperfections at the edge of the optics are reduced. As a further example, in particular embodiments, a combiner for the system may be reduced substantially in size while still allowing an operator to observe an adequate field. Thus, viewability and packaging constraints may be achieved.

Of course, some embodiments may possess none, one, some, or all of these technical features and/or additional technical features. Other technical features will be readily apparent to those skilled in the art from the following figures, written description, and claims.

BRIEF DESCRIPTION OF THE DRAWINGS

The figures described below provide a more complete understanding of the present invention and its technical features, especially when considered with the following detailed written description.

DETAILED DESCRIPTION OF THE INVENTION

Figure 1:
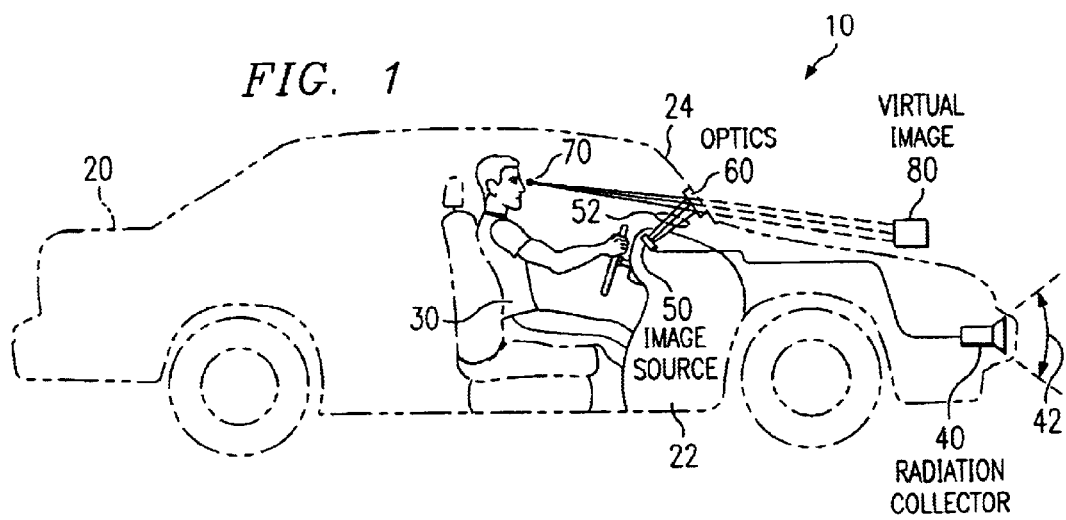
FIG. 1 is a diagrammatic view of a system for providing images for an operator of a vehicle in accordance with one embodiment of the present invention.

FIG. 1 is a diagrammatic view of a system 10 for providing images for an operator 30 of a vehicle 20 in accordance with one embodiment of the present invention. In general, system 10 includes an image source 50 located in a dashboard 22 of vehicle 20 and optics 60 located in and/or on dashboard 22. In particular embodiments, a windshield 24 of vehicle 20 may be used as part of system 10. Image source 50 generates a visual image that, after encountering optics 60, and possibly windshield 24, is presented, in part, at a viewing location 70 for operator 30. Note that the image presented at viewing location 70 will probably appear as a virtual image 80 to operator 30.

To generate the visual image, image source 50 receives electrical signals representing the electromagnetic radiation collected by a radiation collector 40. Radiation collector 40 collects electromagnetic radiation within its field-of-view (FOV), indicated by arrow 42. Note that, although not illustrated, radiation collector 40 also has a horizontal FOV. Accordingly, as illustrated, radiation collector 40 is collecting electromagnetic radiation in front of vehicle 20. In other embodiments, however, radiation collector 40 may be used to collect electromagnetic radiation at any. orientation relative to vehicle 20, such as, for example, rearward, which may be useful for backing situations. Note that, in certain embodiments, different orientations may be presented by system 10 at different times.

In operation, radiation collector 40 collects electromagnetic radiation emitted by objects within FOV 42 and generates electrical signals that represent the electromagnetic radiation. Radiation collector 40 then communicates the electrical signals that represent the collected electromagnetic radiation to image source 50. Image source 50 processes the electrical signals to create a visual image that represents the collected electromagnetic radiation and then generates the visual image, represented by light rays 52. Light rays 52 propagate through vehicle 20 and encounter optics 60, which manipulate and/or redirect a portion of rays 52 to viewing location 70, where operator 30 observes them, and hence part of the visual image. Manipulating light rays 52 may include magnification, correcting for distortions, and/or applying any other appropriate optical effect.

The components of system 10 may have a variety of forms. For example, vehicle 20 may be a car, a truck, or any other type of transportation device. As another example, image source 50 may be a liquid crystal display (LCD), a gas-plasma display, or any other type of device that can produce a visual image. In particular embodiments, image source 50 includes a Sharp LQ025A3FR23 LCD that is back-lit with a Cold Cathode Fluorescent Lamp (CCFL) tube. As a further example, optics 60 may include a reflector, a mirror, a lens, a beam splitter, a combiner, and/or any other type of device for manipulating and/or redirecting light. Moreover, if an embodiment includes a combiner, it may be 100% reflective, opaque, or clear. The optical elements may be mounted in, on, and/or to dashboard 22 or any other appropriate portion of vehicle 20. As an additional example, radiation collector 40 may be a Mercury-Cadmium-Telluride photodetector, an Indium-Antimonide photodetector, an Indium-Gallium-Arsenide photodetector, a microbolometer (either dielectric or resistive), a charge-coupled-device, or any other type of device that can detect electromagnetic radiation. In particular embodiments, the radiation collector is a Barium-Strontium-Titinate uncooled pyroelectric array. In certain embodiments, the radiation collector collects infrared radiation in the far infrared band, such as, for example, 8–12 microns, although any of a variety of other bands may be used, such as, for example, 3–5 microns (the mid-range infrared band), 0.8–2 microns (the near infrared band), or less than 0.8 microns (the visible band).

In particular embodiments, image source 50 and optics 60 are sized, spaced, and/or arranged so that the visual image produced by image source 50 is larger than the image that at least one element of optics 60 can use to present an image for operator 30 at viewing location 70, resulting in a negative eyebox because not all of the visual image may be viewed at viewing location 70. Accordingly, operator 30 may have to use several head/eye positions to view all of virtual image 80.

These embodiments have several technical features. For example, because more of a visual image may be viewed than optics 60 can produce at one viewing location, system 10 may provide an adequate view of the scene outside vehicle 20 when optical considerations do not allow complete observation of the scene at one viewing location. For instance, assume that an image display has a magnifying optical element that acts as a combiner on dashboard 22 and that the system has a vertical FOV of 3.3°, an eye to combiner distance of 500 mm, a vertical eyebox of 10 mm, a virtual image distance of 2,000 mm, an image source vertical aperture of 16.9 mm, and a combiner height of 55 mm. Enlarging the vertical aperture of the image source to 27 mm, which makes the combiner act essentially as the field stop for the system, provides a total vertical FOV of 5.28° to the operator upon using a variety of viewing locations. This amounts to a 60% increase in the total vertical FOV that may be observed by the operator. Moreover, the instantaneous vertical PFOV is increased to 4°, which is a 21.2% increase over the relatively narrow 3.3° provided previously. Thus, enlarging the visual image provided by the image source beyond that which a combiner can use to present an image at a viewing location may allow a substantial increase in the instantaneous vertical FOV and the total vertical FOV.

Figure 2A:
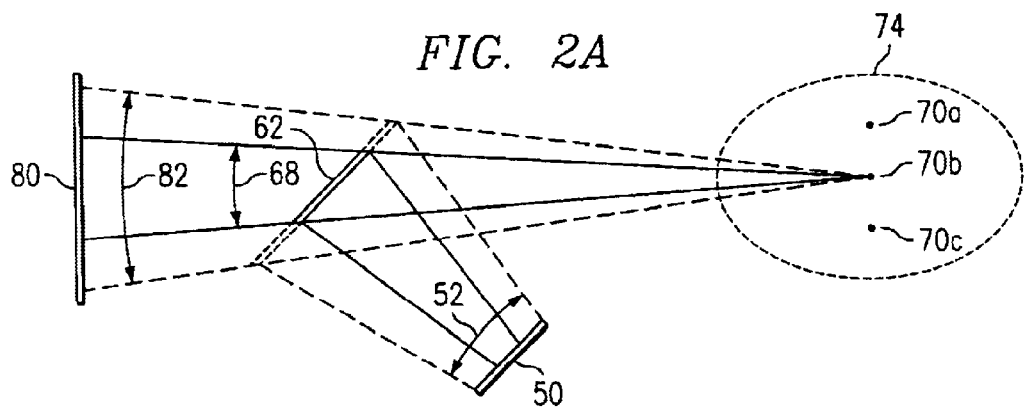
FIGS. 2A–C provide side views of an unfolded representation of embodiments of the system in FIG. 1.
Figure 2B:
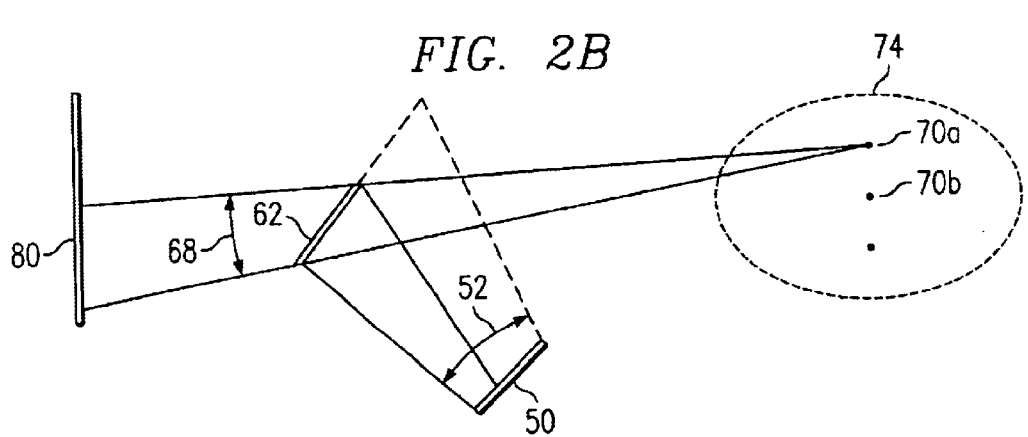
Figure 2C:
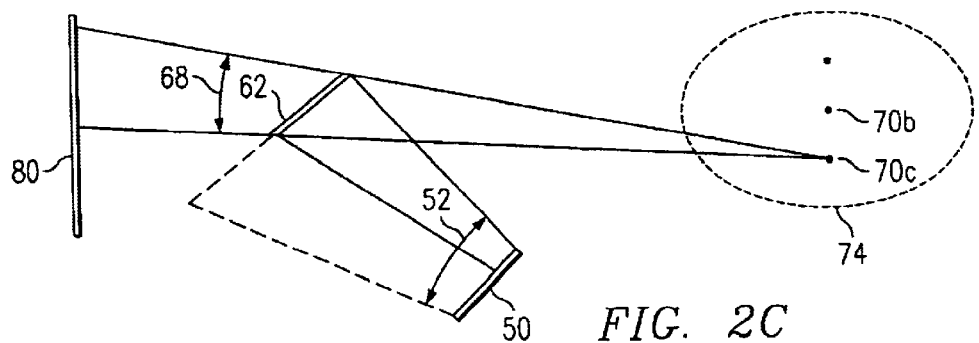

FIGS. 2A–C provide side views of an unfolded representation for the above discussed embodiments. As mentioned previously, in these embodiments, optics 60 includes a magnifying optical element 62, which acts as a combiner, mounted to dashboard 22. Also, the system has a variety of viewing locations, represented by 70*a–c*. Note that viewing locations 70*a–c* may be part of an eye ellipse 74—a representation of the horizontal and vertical positions at which operators' eyes will be located for a particular vehicle. Various industry standard documents, such as, for example, SAE J941, entitled "Motor Vehicle Drivers' Eye Locations," may be used to define an eye ellipse for a vehicle.

As can be seen in FIG. 2A, the sizing, spacing, and/or arrangement of image source 50 and optical element 62 allow the vertical dimension, represented by arrow 52, of the visual image generated by image source 50, and hence virtual image 80, to be larger than the image that optical element 62 can present at viewing location 70*b*. In effect, therefore, optical element 62 becomes the field stop for the system.

Accordingly, the vertical FOV, represented by arrow 68, that can be observed by operator 30 at viewing location 70*b* is smaller than the total vertical FOV, represented by arrow 82, produced by the combination of optical element 62 and image source 50. As operator 30 adjusts her eye position to different viewing locations, however, other portions of virtual image 80 become observable.

For example, if operator 30 adjusts eye position from viewing location 70*b* to viewing location 70*a*, as illustrated in FIG. 2B, the lower portion of virtual image 80 becomes observable. Thus, operator 30 may view the lower portion of an object observed at viewing location 70*b* and/or view an object that was not observable at viewing location 70*b* by adjusting eye position to viewing location 70*a*. Note that while the instantaneous vertical FOV 68 at viewing location 70*a* is slightly larger than the instantaneous vertical FOV 68 at viewing location 70*b*, this will not necessarily be true for all viewing locations in the operator's eye ellipse 74.

As another example, if operator 30 adjusts eye position from viewing location 70b to viewing location 70c, as illustrated in FIG. 2C, the upper part of virtual image 80 becomes observable. Thus, operator 30 may observe the upper portion of an object observed at viewing location 70b and/or observe an object that was not observable at viewing location 70b. Note again, that the instantaneous vertical FOV 68 at viewing location 70c is slightly larger than the instantaneous vertical FOV 68 at viewing location 70b.

It should be recognized that the spacing between viewing locations 70a–c has been exaggerated to illustrate the principles of the invention. Accordingly, in actual implementations, the spacing between viewing locations 70a–c will probably be on the order of approximately 20 to 40 mm. Furthermore, it should be recognized that there is a continuum of viewing locations between viewing locations 70a–c. Additionally, as mentioned previously, the instantaneous vertical FOV 68 changes with the viewing location. Thus, for shorter and/or taller operators, the instantaneous vertical FOV presented by combiner 62 will vary. Accordingly, the height of varying operators may need to be taken into account when designing an image system in accordance with the present invention. In particular embodiments, this may be achieved by designing the system for a substantial portion of the operator's eye ellipse, such as, for example, greater than 95%.

Figure 3:
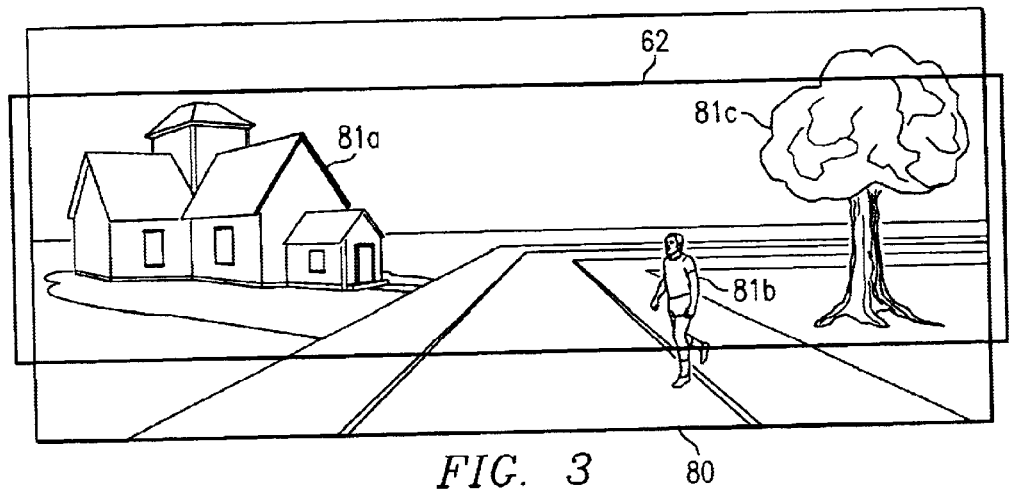
FIG. 3 illustrates one aspect of the operation of the embodiments in FIGS. 2A–C.

FIG. 3 illustrates the operation of optical element 62 relative to virtual image 80. As illustrated, virtual image 80 includes objects 81. Note that objects 81 may be illustrated in more or less detail than may be observable in an actual implementation. At the current viewing location, such as, for example, viewing location 70b, the top part of object 81c and the bottom part of object 81b are not observable. At a different viewing location, however, such as for example, viewing location 70a, the bottom of object 81b may be observed. Additionally, at another viewing location, such as, for example, viewing location 70c, the top part of object 81c may be observed. Note that there may be a continuum of viewing locations at which different portions of virtual image 80 may be observed.

FIG. 3 also assists in demonstrating other technical features of these embodiments. As can be seen, because virtual image 80 is larger than the image that optical element 62 can use to present an image at one viewing location, the border between the visual image and the actual scene around optical element 62 is reduced. Thus, at least some distracting features of the border effect are lessened, at least for certain viewing locations. Additionally, distortions and/or aberrations caused by imperfections at the edge of optical element 62 may be smoothed by having the image extend beyond the edge.

Note that the image presented by system 10 may or may not be minified relative to the image of the actual scene. Thus, a 4° FOV from the operator's perspective may actually represent 4° of actual scene or a much larger portion of the actual scene. Also note that other information may be presented in the visual image generated by image source 50.

Another technical feature of the invention is that, in certain embodiments, one or more elements of optics 60 may be reduced in size and still allow adequate viewing of the scene outside vehicle 20, which reduces problems with driver visibility around or over the image display system and packaging within dashboard 22. For instance, assume again that an image display system has a magnifying optical element mounted to dashboard 22 that acts as a combiner and that has a vertical FOV of 4°, an eye to combiner distance of 500 mm, a vertical eyebox of 20 mm, a virtual image distance of 2,000 mm, and a combiner height of 49.92 mm. Reducing the combiner height to 33.21 mm (a reduction of approximately 33.47%) provides a 3.8° instantaneous vertical FOV with a total vertical FOV of 4°. Accordingly, while the instantaneous vertical FOV is reduced by only 5%, the total scene may still be observed. Thus, this feature may provide a significant improvement in packaging size while providing comparable FOV performance.

Figure 4:
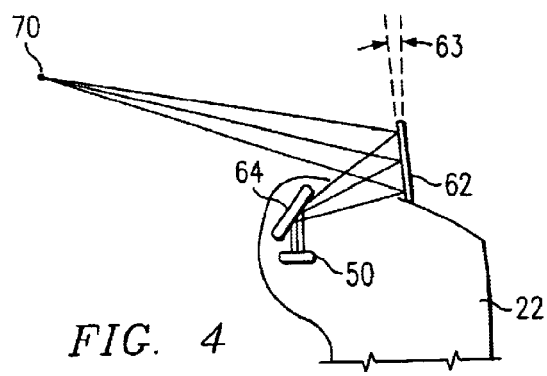
FIG. 4 illustrates another embodiment of the system in FIG. 1.

FIG. 4 illustrates another embodiment of system 10. As illustrated, this embodiment includes image source 50 and a fold mirror 64 located within dashboard 22. The embodiment also includes a magnifying optical element 62 mounted to dashboard 22. As illustrated, magnifying optical element 62 is tilted, as indicated by arrow 63, approximately 15° from vertical, although other inclinations may be used in other embodiments. In particular embodiments, magnifying optical element 62 may retract within dashboard when not in use.

In operation, image source 50 generates a visual image based on the information from an electromagnetic radiation collector, such as, for example, radiation collector 40. The visual image then propagates from image source 50 and encounters fold mirror 64, which redirects the visual image toward magnifying optical element 62. Upon encountering optical element 62, a portion of the visual image is directed toward a viewing location 70 for presentation. As discussed previously, different portions of the visual image may be viewed at different viewing locations.

The embodiment illustrated in FIG. 4 has several additional technical features. For example, using fold mirror 64 allows for an increased path length between image source 50 and magnifying optical element 62, which provides flexibility in the mechanical packaging of the image display. As another example, because the visual image from image source 50 does not pass close to optical element 62, the size of the visual image is not inhibited by optical element 62.

Figure 5:
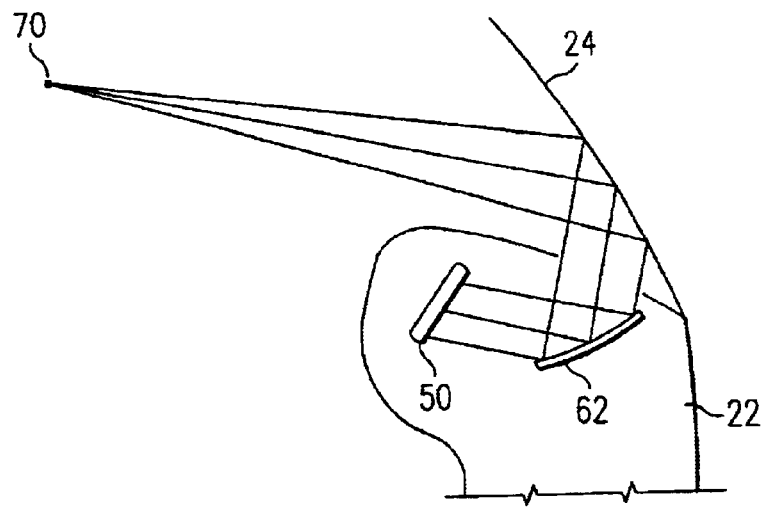
FIG. 5 illustrates still another embodiment of the system in FIG. 1.

FIG. 5 illustrates still another embodiment of system 10. As illustrated, this embodiment includes image source 50 and magnifying optical element 62 located within dashboard 22. Additionally, the embodiment uses windshield 24 of vehicle 20 as the combiner.

In operation, image source 50 generates a visual image based on the information from an electromagnetic radiation collector, such as, for example, radiation collector 40. The visual image then propagates from image source 50 to magnifying optical element 62, which magnifies and redirects the visual image toward windshield 24. In particular embodiments, optical element 62 may also correct for distortions caused by windshield 24. Upon encountering windshield 24, a portion of the visual image is directed toward viewing location 70 for presentation to the operator of the vehicle. As discussed previously, different portions of the visual image may be viewed at different viewing locations.

The embodiment illustrated in FIG. 5 has several additional technical features. For example, when magnifying optical element 62 is limited by packaging constraints or edge effects, a larger FOV and/or attenuation of the edge effects may be obtained. As another example, using windshield 24 as the combiner allows the operator a full FOV when then image system is not in use. Additionally, no border effects are present at the edge of the image.

Other embodiments of the invention may use combinations of the previously discussed embodiments. For example, in some embodiments, the invention may have image source 50 and magnifying optical element 62 in dashboard 22 and a combiner mounted to dashboard 22. Moreover, the combiner may itself be a magnifying optical element or a non-magnifying optical element, such as, for example, a flat combiner. Accordingly, the present invention is not limited to any particular collection and/or arrangement of optical components.

Furthermore, the present invention is not limited to any particular optical parameter, such as, for example, look down angle, virtual image distance, field-of-view, eye to combiner distance, optical element size, and/or image source aperture size. For instance, the invention may be applicable to systems having a virtual image distance between approximately one to one-hundred meters.

In embodiments using a magnifying optical element, the optical element may be designed according to the well known Zernike Equations, in which:

$$Z(X, Y) = S(X, Y) + \sum_{i=1}^{24} C_i Z_i(X, Y),$$

$$S(X, Y) = Ry + \sqrt{\left(Ry - R - \sqrt{R^2 - Y^2}\right)^2 - X^2},$$

$$Z_1(X, Y) = 1,$$
$$Z_2(X, Y) = X,$$
$$Z_3(X, Y) = Y,$$
$$Z_4(X, Y) = X^2 + Y^2,$$
$$Z_5(X, Y) = X^2 - Y^2,$$
$$Z_6(X, Y) = 2XY,$$
$$Z_7(X, Y) = X(X^2 + Y^2),$$
$$Z_8(X, Y) = Y(X^2 + Y^2),$$
$$Z_9(X, Y) = X(X^2 - 3Y^2),$$
$$Z_{10}(X, Y) = Y(3X^2 - Y^2),$$
$$Z_{11}(X, Y) = (X^2 + Y^2)^2,$$
$$Z_{12}(X, Y) = X^4 - Y^4,$$
$$Z_{13}(X, Y) = 2XY(X^2 + Y^2),$$
$$Z_{14}(X, Y) = X^4 - 6X^2Y^2 + Y^4,$$
$$Z_{15}(X, Y) = 4XY(X^2 - Y^2),$$
$$Z_{16}(X, Y) = X(X^2 + Y^2)^2,$$
$$Z_{17}(X, Y) = Y(X^2 + Y^2)^2,$$
$$Z_{18}(X, Y) = X^5 - 2X^3Y^2 - 3XY^4,$$
$$Z_{19}(X, Y) = 3X^4Y + 2X^2Y^3 - Y^5,$$
$$Z_{20}(X, Y) = X^5 - 10X^3Y^2 - Y^5,$$
$$Z_{21}(X, Y) = 5X^4Y - 10X^2Y^3 + Y^5,$$
$$Z_{22}(X, Y) = (X^2 + Y^2)^3,$$
$$Z_{23}(X, Y) = (X^2 + Y^2)^4, \text{ and}$$
$$Z_{24}(X, Y) = (X^2 + Y^2)^5.$$

As is well known to those skilled in the art, the coefficients for these equations may be determined by specifying the optical parameters for a given optical system—such as, for example, look down angle, virtual image distance, and eyebox size, which will probably vary greatly from system to system—and iterating the equations using well known computer programs.

Figure 6:
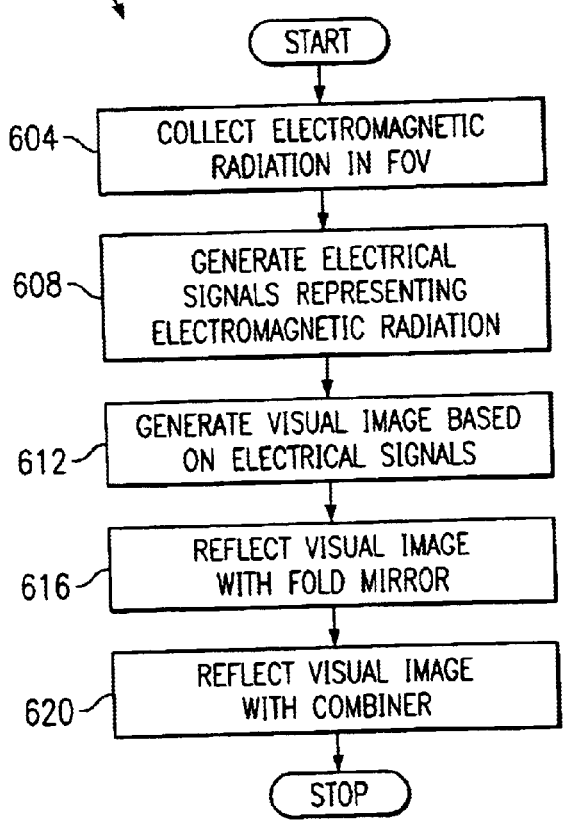
FIG. 6 is a flowchart illustrating a method for providing images for an operator of a vehicle in accordance with one embodiment of the present invention.

FIG. 6 is a flowchart 600 illustrating a method for providing images in accordance with one embodiment of the present invention. The method begins at function block 604 with collecting electromagnetic radiation in a field-of-view. The method continues at function block 608 with generating electrical signals that represent the electromagnetic radiation. At function block 612, the method calls for generating a visual image based on the electrical signals. The method then calls for reflecting the visual image with a fold mirror at function block 616 and reflecting the visual image with a combiner at function block 620. Note that an image display system may repeat these operations numerous time per second, such as, for example, at a video rate of 30–60 Hz.

Although FIG. 6 illustrates a method for providing images in accordance with one embodiment of the present invention, other embodiments may have less, more, and/or a different arrangement of operations. For example, in some embodiments, the visual image may not be reflected from a fold mirror before encountering the combiner. As another example, in certain embodiments, the visual image may be redirected and/or manipulated by any of a variety of other optical elements, including the vehicle's windshield.

While the present invention has been described in reference to head-up displays (HUDs)—display systems where the windshield of the vehicle acts as the combiner —and direct view displays—display systems where the magnifying optical element acts as the combiner, also known as CHUDs—the invention is useful for a variety of other types of displays. For example, the invention may be useful for virtual image displays (VIDs)—a head-down system using a virtual image. Accordingly, the present invention is applicable to a wide variety of display types. Moreover, while the present invention has been described in reference to night vision systems, it may be applicable to day vision systems too.

While the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for providing images for an operator of a vehicle, comprising:
   receiving electrical signals representing electromagnetic radiation at an image source;
   generating a visual image based on the electrical signals; and
   reflecting different portions of the visual image with a magnifying optical element for presentation at different viewing locations, the visual image appearing as a virtual image;
   wherein at least one dimension of the visual image is larger than the magnifying optical element can use to present an image at one of the viewing locations.

2. The method of claim 1, wherein the dimension comprises the vertical.

3. The method of claim 1, wherein the vertical field-of-view of the virtual image is at least one degree larger than the vertical field-of-view at the viewing location.

4. The method of claim 1, wherein the magnifying optical element comprises an aspheric magnifying reflector.

5. The method of claim 1, further comprising reflecting the visual image with a mirror before the visual image encounters the magnifying optical element.

6. The method of claim 1, further comprising reflecting the visual image with the windshield for presentation at the viewing locations.

7. The method of claim 1, further comprising:
receiving electromagnetic radiation; and
generating the electrical signals that represent the electromagnetic radiation.

8. The method of claim 1, wherein the electrical signals received at the image source represent infrared radiation from a field-of-view in front of the vehicle.

9. The method of claim 1, wherein the dimension of the visual image is larger than the magnifying optical element can use to present an image at a substantial portion of the viewing locations in an eye ellipse.

10. The method of claim 9, wherein the portion is greater than approximately ninety-five percent of the eye ellipse.

11. A method for providing images for an operator of a vehicle, comprising:
receiving electrical signals representing electromagnetic radiation at an image source;
generating a visual image based on the electrical signals; and
reflecting different portions of the visual image with a magnifying optical element for presentation at different viewing locations, the visual image appearing as a virtual image;
wherein the total field-of-view of at least one dimension of the virtual image is larger than the field-of-view that the magnifying optical element can present in that dimension at one of the viewing locations.

12. The method of claim 11, wherein the dimension comprises the vertical.

13. The method of claim 12, wherein the total vertical field-of-view of the virtual image is at least one degree larger than the vertical field-of-view that the magnifying optical element can present at the viewing location.

14. The method of claim 11, wherein the magnifying optical element comprises an aspheric magnifying reflector.

15. The method of claim 11, further comprising reflecting the visual image with the windshield for presentation at the viewing location.

16. The method of claim 11, wherein the total field-of-view of at least one dimension the virtual image is larger than the field-of-view that the magnifying optical element can present at a substantial portion of the viewing locations in an eye ellipse.

17. The method of claim 11, wherein the portion of the eye ellipse is greater than approximately ninety-five percent of the eye ellipse.

18. A system for providing images for an operator of a vehicle, comprising:
an image source operable to receive electrical signals representing electromagnetic radiation and generate a visual image based on the electrical signals; and
a magnifying optical element operable to reflect different portions of the visual image for presentation at different viewing locations, the visual image appearing as a virtual image;
wherein at least one dimension of the visual image is larger than the magnifying optical element can use to present an image at one of the viewing locations.

19. The system of claim 18, wherein the dimension comprises the vertical.

20. The system of claim 18, wherein the vertical field-of-view of the virtual image is at least one degree larger than the vertical field-of-view at the viewing location.

21. The system of claim 18, wherein the magnifying optical element comprises an aspheric magnifying reflector.

22. The system of claim 18, further comprising a mirror positioned to reflect the visual image before it encounters the magnifying optical element.

23. The system of claim 18, further comprising the windshield of the vehicle, the windshield reflecting the visual image for presentation at the viewing locations.

24. The system of claim 18, further comprising a radiation collector operable to receive electromagnetic radiation and generate the electrical signals that represent the electromagnetic radiation, the radiation collector coupled to the image source.

25. The system of claim 18, wherein the electrical signals received at the image source represent infrared radiation from a field-of-view in front of the vehicle.

26. The system of claim 18, wherein the dimension of the visual image is larger than the magnifying optical element can use to present an image at a substantial portion of the viewing locations in an eye ellipse.

27. The system of claim 26, wherein the portion is greater than approximately ninety-five percent of the eye ellipse.

28. A system for providing images for an operator of a vehicle, comprising:
an image source operable to receive electrical signals representing infrared radiation and generate a visual image based on the electrical signals;
a fold mirror positioned to reflect the visual image; and
an aspheric magnifying reflector positioned to reflect different portions of the visual image for presentation at different viewing locations, the visual image appearing as a virtual image;
wherein the vertical dimension of the visual image is larger than the aspheric magnifying mirror can use to present an image at a substantial portion of the viewing locations in an eye ellipse.

* * * * *